(12) United States Patent
Yamamoto et al.

(10) Patent No.: US 9,991,531 B2
(45) Date of Patent: Jun. 5, 2018

(54) FUEL CELL SYSTEM

(71) Applicant: TOYOTA JIDOSHA KABUSHIKI KAISHA, Toyota-shi, Aichi-ken (JP)

(72) Inventors: Kazuo Yamamoto, Toyota (JP); Hiroyuki Imanishi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 9 days.

(21) Appl. No.: 14/938,189

(22) Filed: Nov. 11, 2015

(65) Prior Publication Data

US 2016/0141659 A1    May 19, 2016

(30) Foreign Application Priority Data

Nov. 14, 2014  (JP) .................... 2014-231703
Sep. 4, 2015  (JP) .................... 2015-174975

(51) Int. Cl.
*H01M 8/04* (2016.01)
*H01M 8/04119* (2016.01)
(Continued)

(52) U.S. Cl.
CPC ... *H01M 8/04164* (2013.01); *H01M 8/04097* (2013.01); *H01M 8/04179* (2013.01);
(Continued)

(58) Field of Classification Search
CPC ......... H01M 8/04097; H01M 8/04201; H01M 8/0444; H01M 8/0662
See application file for complete search history.

(56) References Cited

U.S. PATENT DOCUMENTS

2004/0229098 A1  11/2004  Fujita
2007/0196709 A1  8/2007  Umayahara et al.
(Continued)

FOREIGN PATENT DOCUMENTS

DE  102004023854 A1  12/2004
JP  2005-166498  *  6/2005  .............. H01M 8/04
(Continued)

OTHER PUBLICATIONS

US Patent and Trademark Office, Office Action in U.S. Appl. No. 14/935,590, dated May 17, 2017, 16 pages.
(Continued)

*Primary Examiner* — Osei K Amponsah
(74) *Attorney, Agent, or Firm* — Hunton Andrews Kurth LLP

(57) ABSTRACT

A fuel cell system includes a control unit that estimates a discharge amount of the fuel gas partially discharged from the fuel cell partially discharged during an opening period of the discharge valve based on a lost amount of the fuel gas during the opening period and a consumed amount of the fuel gas by electric generation of the fuel cell during the opening period, wherein a pressure increase period during which the pressure increases and a pressure decrease period during which the pressure decreases exist due to intermittent injection of the fuel gas, and the control unit estimates the lost amount of the fuel gas based on a decrease rate of the pressure during the pressure decrease period within the opening period, and based on an assumed decrease rate of the pressure during the pressure increase period within the opening period.

6 Claims, 11 Drawing Sheets

(51) Int. Cl.
*H01M 8/04082* (2016.01)
*H01M 8/04089* (2016.01)
*H01M 8/0438* (2016.01)
*H01M 8/04746* (2016.01)

(52) U.S. Cl.
CPC ... *H01M 8/04201* (2013.01); *H01M 8/04402* (2013.01); *H01M 8/04753* (2013.01)

(56) References Cited

U.S. PATENT DOCUMENTS

| | | |
|---|---|---|
| 2009/0226783 A1 | 9/2009 | Hasegawa |
| 2013/0071767 A1 | 3/2013 | Katano |
| 2016/0133970 A1 | 5/2016 | Yamamoto et al. |

FOREIGN PATENT DOCUMENTS

| | | | | |
|---|---|---|---|---|
| JP | 2005-302708 A | 10/2005 | | |
| JP | 2005-339847 A | 12/2005 | | |
| JP | 2007-172971 A | 7/2007 | | |
| JP | 2007-305563 | * 11/2007 | ............. | H01M 8/04 |
| JP | 2007-305563 A | 11/2007 | | |
| KR | 2006-0124771 A | 12/2006 | | |

OTHER PUBLICATIONS

US Patent and Trademark Office, Final Office Action in U.S. Appl. No. 14/935,590, dated Oct. 19, 2017, 14 pages.
U.S. Patent & Trademark Office, Notice of Allowance dated Jan. 23, 2018 and Allowed Claims for U.S. Appl. No. 14/935,590.
U.S. Patent & Trademark Office, Notice of Allowance dated Mar. 30, 2018 for U.S. Appl. No. 14/935,590.

* cited by examiner

FUEL CELL SYSTEM

CROSS-REFERENCE TO RELATED APPLICATION

This application is based upon and claims the benefit of priority of the prior Japanese Patent Application No. 2014-231703, filed on Nov. 14, 2014, and the prior Japanese Patent Application No. 2015-174975, filed on Sep. 4, 2015, the entire contents of which are incorporated herein by reference.

FIELD OF THE INVENTION

The present invention relates to a fuel cell system.

BACKGROUND

There has been known a fuel cell system that includes: a gas-liquid separator storing and separating water from a fuel gas discharged from a fuel cell; and a discharge valve connected to the gas-liquid separator and discharging the fuel gas to the outside together with the stored water in the gas-liquid separator. When such a discharge valve is opened, the stored water is discharged at first, and then the fuel gas is discharged. For example, Japanese Patent Application Publication No. 2007-305563 discloses technology for estimating a discharge amount of the fuel gas based on a flow rate calculated using a decrease amount of the pressure on the downstream side of an injector during a period just before and after the discharge of the fuel gas, and based on a flow rate calculated using a change amount of hydrogen consumed amount in the fuel cell.

SUMMARY OF THE INVENTION

It is therefore an object of the present invention to provide a fuel cell system that reduces deterioration in estimation accuracy of a discharge amount of a fuel gas.

According to an aspect of the present invention, there is provided a fuel cell system including: a fuel cell; a fuel injection portion that injects a fuel gas to the fuel cell; a supply passage through which the fuel gas injected from the fuel injection portion flows to the fuel cell; a circulation passage through which the fuel gas partially discharged from the fuel cell flows to the supply passage; a gas-liquid separator that is arranged in the circulation passage and that stores and separates water from the fuel gas partially discharged from the fuel cell; a discharge passage that is connected to the gas-liquid separator, discharges stored water in the gas-liquid separator to an outside, and partially discharges the fuel gas partially discharged from the fuel cell to the outside; a discharge valve that is arranged in the discharge passage; a pressure detecting portion that detects pressure in the supply passage; and a control unit that estimates a discharge amount of the fuel gas partially discharged from the fuel cell partially discharged during an opening period of the discharge valve on a basis of a lost amount of the fuel gas during the opening period and a consumed amount of the fuel gas by electric generation of the fuel cell during the opening period, wherein a pressure increase period during which the pressure increases and a pressure decrease period during which the pressure decreases exist due to intermittent injection of the fuel gas from the fuel injection portion, and the control unit estimates the lost amount of the fuel gas based on a decrease rate of the pressure during the pressure decrease period within the opening period, and based on an assumed decrease rate of the pressure during the pressure increase period within the opening period, the pressure during the pressure increase period being assumed to decrease at the assumed decrease rate same as the decrease rate of the pressure during the pressure decrease period.

According to another aspect of the present invention, there is provided a fuel cell system including: a fuel cell; a fuel injection portion that injects a fuel gas to the fuel cell; a supply passage through which the fuel gas injected from the fuel injection portion flows to the fuel cell; a circulation passage through which the fuel gas partially discharged from the fuel cell flows to the supply passage; a gas-liquid separator that is arranged in the circulation passage and that stores and separates water from the fuel gas partially discharged from the fuel cell; a discharge passage that is connected to the gas-liquid separator, discharges stored water in the gas-liquid separator to an outside, and partially discharges the fuel gas partially discharged from the fuel cell to the outside; a discharge valve that is arranged in the discharge passage; a pressure detecting portion that detects one of pressure in the circulation passage and pressure in the gas-liquid separator; and a control unit that estimates a discharge amount of the fuel gas partially discharged from the fuel cell partially discharged during an opening period of the discharge valve on a basis of a lost amount of the fuel gas during the opening period and a consumed amount of the fuel gas by electric generation of the fuel cell during the opening period, wherein a pressure increase period during which the pressure increases and a pressure decrease period during which the pressure decrease exist due to intermittent injection of the fuel gas from the fuel injection portion, and the control unit calculates the lost amount of the fuel gas during the opening period based on a decrease rate of the pressure during the pressure decrease period within the opening period, and based on an assumed decrease rate of the pressure during the pressure increase period within the opening period, the pressure during the pressure increase period being assumed to decrease at the assumed decrease rate same as the decrease rate of the pressure during the pressure decrease period.

According to still another aspect of the present invention, there is provided a fuel cell system including: a fuel cell; a fuel injection portion that injects a fuel gas to the fuel cell; a supply passage through which the fuel gas injected from the fuel injection portion flows to the fuel cell; a gas-liquid separator that stores and separates water from the fuel gas discharged from the fuel cell; a first discharge passage that supplies the fuel gas partially discharged from the fuel cell to the gas-liquid separator; a second discharge passage that is connected to the gas-liquid separator, discharges stored water in the gas-liquid separator to an outside, and partially discharges the fuel gas partially discharged from the fuel cell to the outside; a discharge valve that is arranged in the second discharge passage; a pressure detecting portion that detects one of pressure in the supply passage, pressure in the first discharge passage, and pressure in the gas-liquid separator; and a control unit that estimates a discharge amount of the fuel gas partially discharged from the fuel cell partially discharged during an opening period of the discharge valve on a basis of a lost amount of the fuel gas during the opening period and a consumed amount of the fuel gas by electric generation of the fuel cell during the opening period, wherein the fuel cell system is an anode non-circulation type fuel cell system that does not return the fuel gas partially discharged from the fuel cell to the supply passage, a pressure increase period during which the pressure increases and a pressure decrease period during which the pressure decreases exist due to intermittent injection of the fuel gas from the fuel injection portion, and the control unit calculates the lost amount of the fuel gas during the opening period based on a decrease rate of the pressure during the pressure decrease period within the opening period and based on an assumed decrease rate of the pressure during the pressure increase period within the opening period, the pressure during the pressure increase period being assumed to decrease at the assumed decrease rate same as the decrease rate of the pressure during the pressure decrease period.

DETAILED DESCRIPTION

The fuel gas is intermittently injected from the injector or the like. The intermittent injection of the fuel gas causes the pressure on the downstream side of the injector to increase and decrease alternately. In such a state, as described in Japanese Patent Application Publication No. 2007-305563, if the gas discharge amount is estimated based on the flow rate calculated using a decrease amount of the pressure on the downstream side of the injector during a period just before and after the discharge of the fuel gas, the gas discharge amount might not be estimated with high accuracy. Thus, the estimation accuracy of the gas discharge amount might deteriorate.

Figure 1:
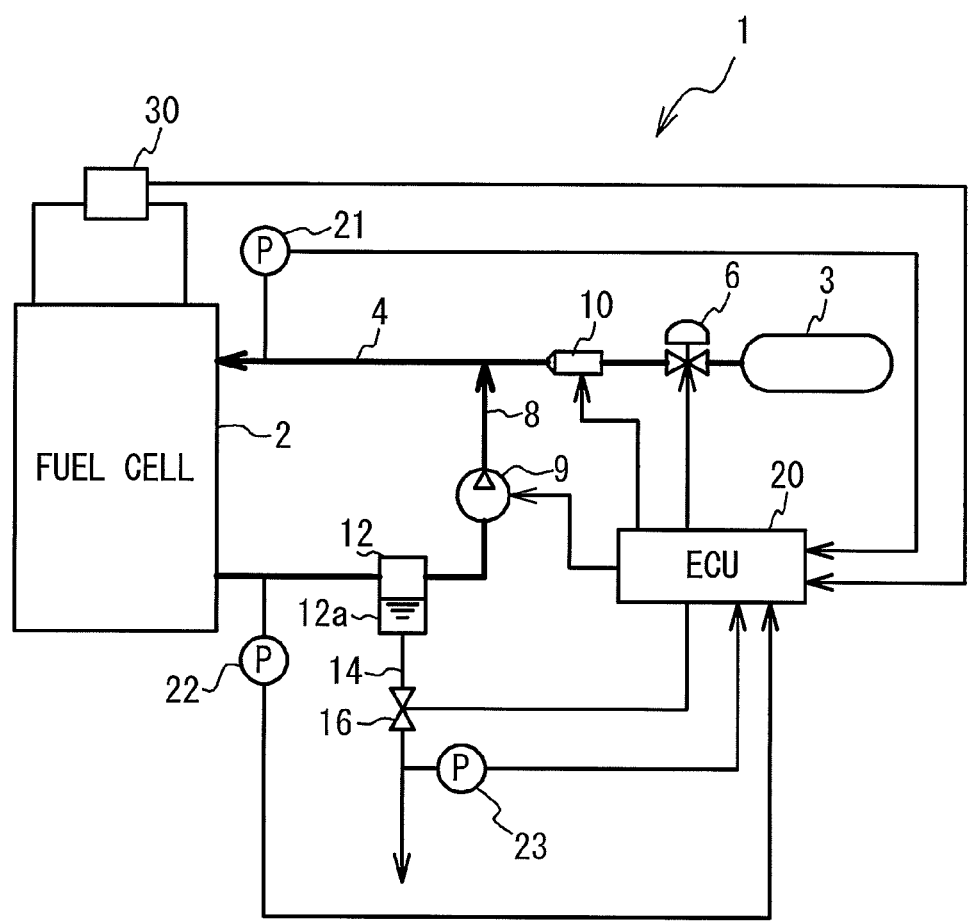
FIG. 1 is a schematic view of a fuel cell system.

A fuel cell system 1 (hereinafter, referred to as a system) according to the present embodiment will be described with reference to drawings. The system 1 can be applied to a system installed in a vehicle. However, the system 1 may be applied to another system. FIG. 1 is a schematic view of the system 1. The system 1 includes a fuel cell 2 as a power supply. In the fuel cell 2, an electrolyte film such as a solid polymer electrolyte membrane is sandwiched between an anode and a cathode of catalyst electrodes (the electrolyte film, the anode, and the cathode are not illustrated). The anode is supplied with a fuel gas containing hydrogen, and the cathode is supplied with an oxidation gas containing oxygen such as air, which generates electricity.

A tank 3 is a fuel supply source supplying the fuel gas to the fuel cell 2. An anode inlet of the fuel cell 2 is connected to a supply passage 4 through which the fuel gas supplied from the tank 3 flows to the fuel cell 2. A regulating valve 6 is arranged in the supply passage 4. The regulating valve 6 reduces the pressure of the fuel gas supplied from the tank 3 to a predetermined pressure, and then the fuel gas is supplied to the fuel cell 2. An injector 10 is arranged further downstream than the regulating valve 6 in the supply passage 4. The injector 10 is an electromagnetic on-off valve. As for the on-off valve, a valve body is directly driven away from a valve seat by the electromagnetic driving force at predetermined intervals, thereby regulating a gas flow rate and a gas pressure. The injector 10 is an example of a fuel injection portion that injects the fuel gas to the fuel cell 2. The injector 10 and the regulating valve 6 are controlled by an ECU (Electronic Control Unit) 20.

An anode outlet of the fuel cell 2 is connected to a circulation passage 8 through which the fuel gas (a fuel off-gas) discharged from the fuel cell 2 flows to the supply passage 4. The circulation passage 8 is provided with a circulation pump 9 for pressurizing and supplying the fuel gas discharged from the fuel cell 2 to the supply passage 4. Therefore, in this system 1, the fuel gas circulates through the supply passage 4 and the circulation passage 8 during operation of the fuel cell 2.

A gas-liquid separator 12 is arranged in the circulation passage 8, separates water from the fuel gas, and has a storage tank 12a for storing the separated water. In the system 1, water generated by the electric generation of the fuel cell 2 leaks through the electrolyte membrane from the cathode side to the anode side. The water that has moved to the anode side is discharged together with the fuel gas to the circulation passage 8, and then is stored in the gas-liquid separator 12.

A bottom portion of the storage tank 12a of the gas-liquid separator 12 is connected to a discharge passage 14 that discharges the fuel gas and the stored water in the gas-liquid separator 12 to the outside. The downstream end of the discharge passage 14 is exposed to the outside air. A discharge valve 16 is arranged in the discharge passage 14. The discharge valve 16 is usually closed, but is opened by the ECU 20 as needed. A shut-off valve or a flow rate regulating valve that controls the discharge state may be employed as the discharge valve 16. In this embodiment, the discharge valve 16 is a shut-off valve. The discharge valve 16 is opened to discharge the water before the stored water overflows from the storage tank 12a, which can prevent the water from being supplied to the fuel cell 2 through the circulation passage 8 and the supply passage 4.

A pressure sensor 21 that detects the pressure in the supply passage 4 is provided further downstream than the injector 10 in the supply passage 4. The pressure sensor 21 basically detects the pressure of the fuel gas to be supplied to the fuel cell 2. A pressure sensor 22 that detects the pressure in the circulation passage 8 is provided further upstream than the gas-liquid separator 12 in the circulation passage 8. The pressure sensor 22 basically detects the pressure of the fuel gas discharged from the fuel cell 2 and detects the pressure at a point further upstream than the discharge valve 16. A pressure sensor 23 that detects the pressure at a point further downstream than the discharge valve 16 in the discharge passage 14 is arranged in the discharge passage 14, and detects the pressure at a point further downstream than the discharge valve 16. A detection value of the pressure sensor 23 indicates generally atmospheric pressure. The pressure sensors 21 to 23 are connected to the input side of the ECU 20, and output signals corresponding to the detected pressure to the ECU 20. The pressure sensor 21 is an example of a pressure detecting portion that detects the pressure in the supply passage 4.

A load device 30 is connected to the fuel cell 2. The load device 30 measures an electric characteristic of the fuel cell 2 and uses, for example, a potentio-galvanostat of a versatile electrochemical type. The load device 30 is electrically connected to an anode side separator and a cathode side separator of the fuel cell 2 through wirings. The load device 30 measures a load current flowing through the fuel cell 2 at the time of electric generation thereof and a load voltage (cell voltage) of the fuel cell 2. The ECU 20 detects a current value of the fuel cell 2 based on output signals from the load device 30.

The ECU 20 includes a microcomputer including a CPU (Central Processing Unit), a ROM (Read Only Memory), and a RAM (Random Access Memory). The ECU 20 is electrically connected to each component of the system 1 and controls operation of each component on the basis of information sent therefrom. The ECU 20 is an example of a control unit that executes control for estimating a discharge amount of the fuel gas described later in detail.

Additionally, a passage for supplying oxidation gas is connected to the cathode inlet of the fuel cell 2, and a passage for discharging an oxidation off-gas is connected to the cathode outlet, but they are omitted in FIG. 1.

As mentioned above, the opening of the discharge valve 16 permits the discharge of the stored water from the gas-liquid separator 12 to the outside. At this time, the fuel gas is partially discharged together with the stored water to the outside. It is desirable herein that the actual discharge amount of the fuel gas discharged from the discharge valve 16 is controlled to be the same as the target gas discharge amount. This is because, if the actual gas discharge amount is much larger than the target gas discharge amount, the fuel gas might be wasted and the fuel consumption might be increased. In contrast, if the actual gas discharge amount is much smaller than the target gas discharge amount, for example, if the actual gas discharge amount is zero, the stored water might not be sufficiently discharged. Thus, this system 1 estimates the discharge amount of the fuel gas discharged during the opening period of the discharge valve 16, and closes the discharge valve 16 when the estimated gas discharge amount reaches the target gas discharge amount.

Figure 2:
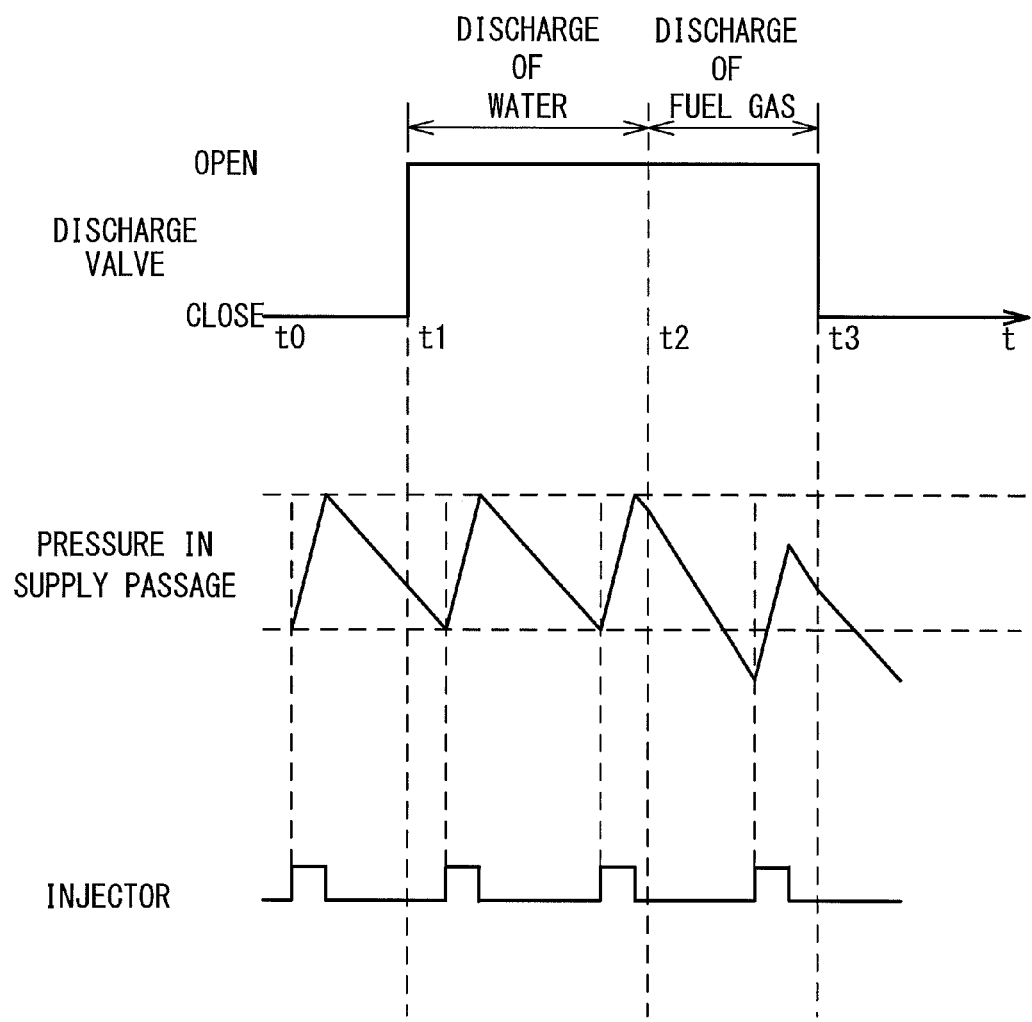
FIG. 2 is a timing chart indicating operation of a discharge valve, a change in pressure in a supply passage, and operation of an injector.

Next, a description will be given of a change in pressure caused by operation of the discharge valve 16. FIG. 2 is a timing chart indicating operation of the discharge valve 16, a change in pressure in the supply passage 4, and operation of the injector 10. FIG. 2 is a timing chart while the fuel gas is intermittently injected from the injector 10. As described above, the pressure in the supply passage 4 is detected by the pressure sensor 21. In FIG. 2, the discharge valve 16 is closed at time t0, the discharge valve 16 is opened at time t1, the discharge of the stored water from the gas-liquid is completed from time t1 to time t2, and the fuel gas is discharged from time t2 to time t3.

As illustrated in FIG. 2, the injector 10 intermittently injects the fuel gas at fixed intervals. The intermittent injection of the fuel gas causes the pressure in the supply passage 4 to increase and decrease alternately. More specifically, the pressure in the supply passage 4 increases during a certain period after the injection of the fuel gas is started, and after that, the pressure decreases till the fuel gas is injected again. The injection pressure of the injector 10 is feedback controlled by the ECU 20 so that the pressure in the supply passage 4 is the same as the target pressure. Thus, the pressure in the supply passage 4 increases and decreases alternately within a certain range from before the discharge valve 16 is opened till the discharge of the water is completed after the discharge valve 16 is opened. Here, the decrease in pressure in the supply passage 4 during the period that the injection of the fuel gas is stopped between time t0 and time t2 is due to the consumption of the fuel gas by electric generation of the fuel cell 2. The reason why the movement of the change in pressure between time t1 and time t2 is substantially the same as the movement of the change in pressure between time t0 and time t1 is because the stored water is discharged between time t1 and time t2 but the fuel gas is not discharged.

When the discharge of the water is completed and the gas-liquid separator 12 and the discharge passage 14 thereby communicate with atmosphere, the fuel gas is discharged through the discharge passage 14. This makes the decrease rate of the pressure in the supply passage 4 between time t2 and time t3 greater than that during the discharge of the water. This is because the discharge of the fuel gas decreases the pressure in the supply passage 4 communicating with the circulation passage 8. Therefore, the decrease in pressure in the supply passage 4 during the period that the injection of the fuel gas is stopped between time t2 and time t3 relates to the consumed amount of the fuel gas by the electric generation of the fuel cell 2 described above and the discharge amount of the fuel gas. When it is determined that the estimated gas discharge amount by the estimation method to be described later reaches the target gas discharge amount, the discharge valve 16 is closed.

Figure 3:
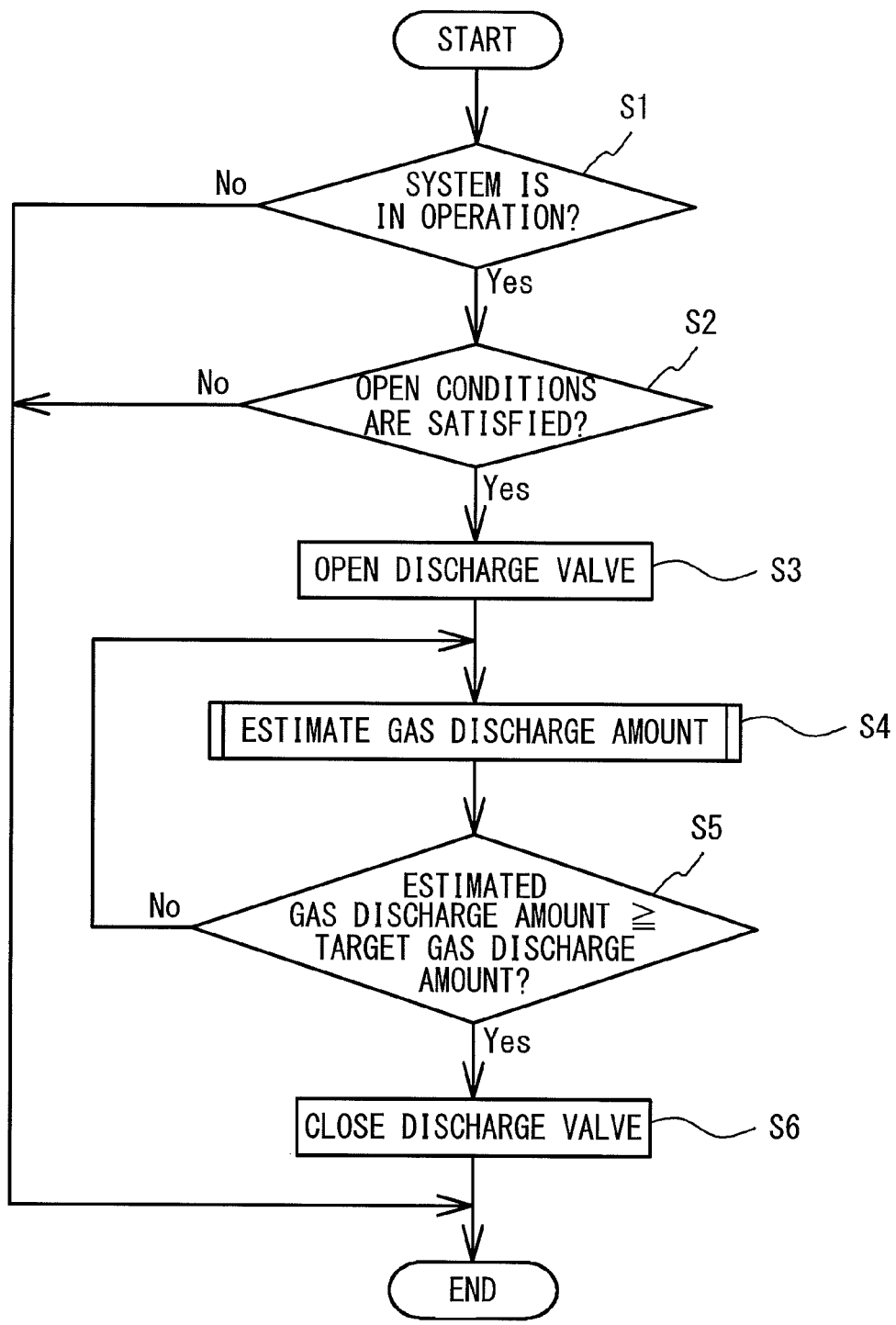
FIG. 3 is a flowchart of opening and closing control for the discharge valve executed by an ECU.

FIG. 3 is a flowchart of the opening and closing control for the discharge valve 16 executed by the ECU 20. The ECU 20 determines whether the system 1 is in operation (step S1). This is because the discharge process of the stored water is executed when the system 1 is in operation. When the system 1 is in operation, the ECU 20 executes processes after step 1. When the system 1 is not in operation, this control is finished.

Next, the ECU 20 determines whether open conditions of the discharge valve 16 are satisfied (step S2). The open conditions are satisfied, for example, when a predetermined period elapses from the time when the discharge valve 16 is opened last, but this does not intend to suggest any limitation. When the open conditions are not satisfied, this control is finished. When the open conditions of the discharge valve 16 are satisfied, the ECU 20 opens the discharge valve 16 (step S3) and estimates the discharge amount of the fuel gas due to the opening of the discharge valve 16 (step S4). The ECU 20 determines whether the estimated gas discharge amount is not less than the target gas discharge amount (step S5) and continues estimating the gas discharge amount until the estimated gas discharge amount becomes not less than the target gas discharge amount. When the estimated gas discharge amount is not less than the target gas discharge amount, the ECU 20 closes the discharge valve 16 (step S6), and this control is finished. The target gas discharge amount may be a preset fixed value or a value set in response to the operation state of the system 1. The above control discharges the stored water in the gas-liquid separator 12 and the desired amount of the fuel gas.

Figure 4:
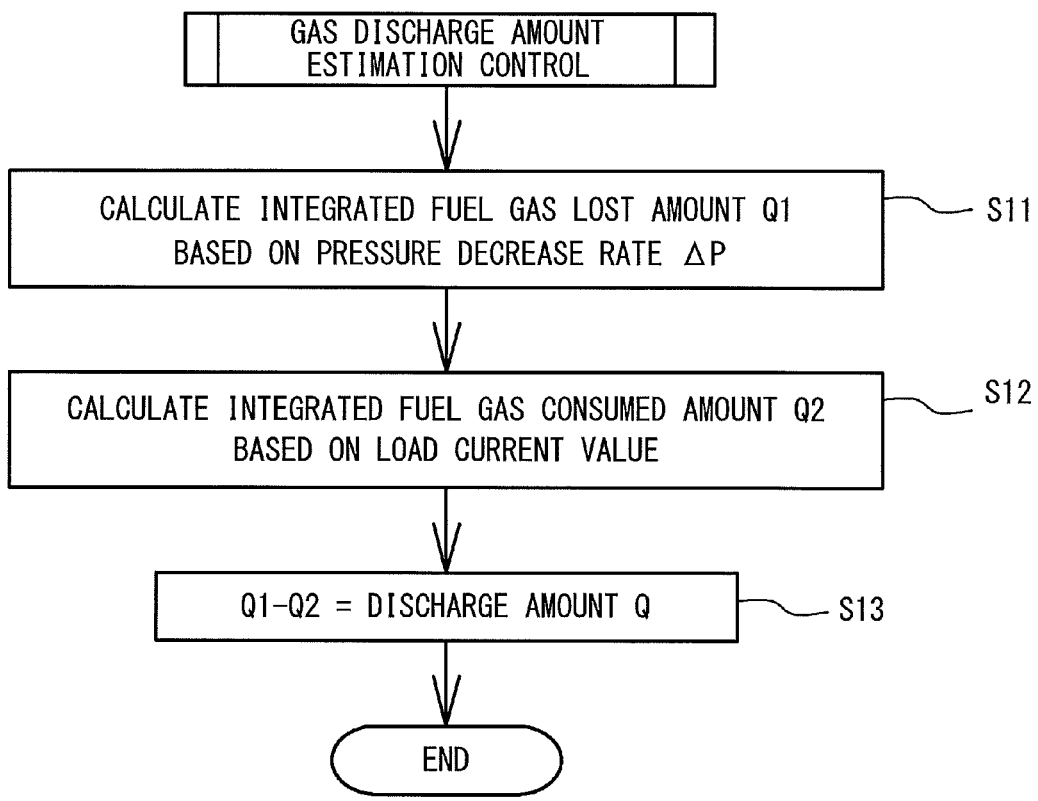
FIG. 4 is a flowchart of gas discharge amount estimation control.

A description will next be given of a method of estimating the gas discharge amount with reference to FIG. 4. FIG. 4 is a flowchart of gas discharge amount estimation control. The estimation method of the present embodiment estimates the discharge amount of the fuel gas based on the lost amount of the fuel gas calculated using the decrease amount of the pressure in the supply passage 4 and the consumed amount of the fuel gas by electric generation of the fuel cell calculated using the current value of the fuel cell 2.

Figure 5:
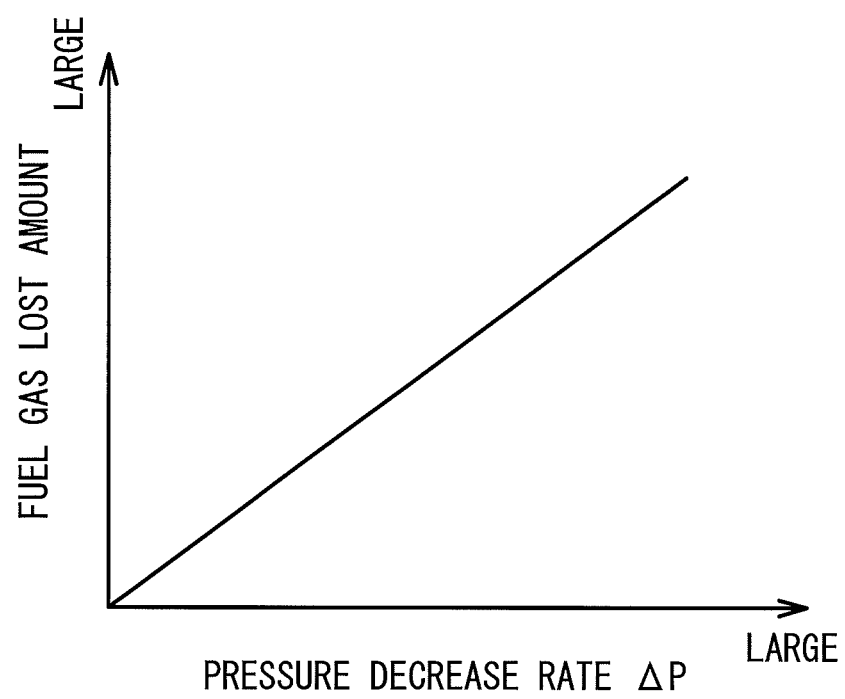
FIG. 5 illustrates a map that defines a relationship between a pressure decrease rate and a fuel gas lost amount.

The ECU 20 calculates an integrated fuel gas lost amount Q1 based on the decrease rate ΔP of the pressure in the supply passage 4 from time t1 when the discharge valve 16 is opened (step S11). FIG. 5 illustrates a map that defines the relationship between the pressure decrease rate ΔP and the fuel gas lost amount. The ECU 20 calculates the fuel gas lost amount per unit time at the pressure decrease rate ΔP per unit time on the basis of the map, integrates the amount from time t1 to the present time, and calculates the integrated fuel gas lost amount Q1. The fuel gas lost amount per unit time may be calculated based on a calculation formula using the pressure decrease rate ΔP.

Figure 6:
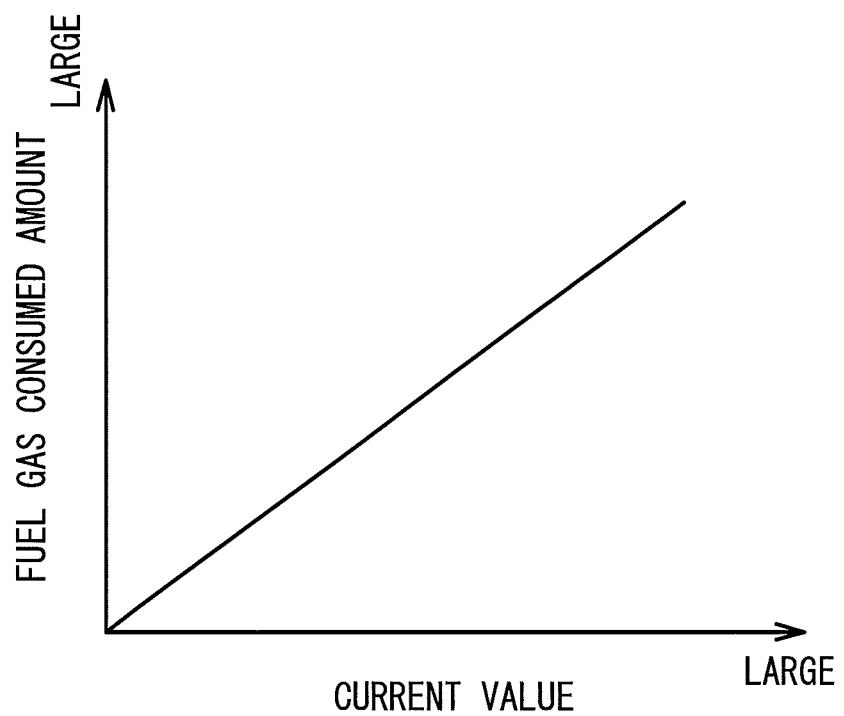
FIG. 6 illustrates a map that defines a relationship between a current value and a fuel gas consumed amount per unit time.

Next, the ECU 20 calculates the integrated fuel gas consumed amount Q2 due to electric generation of the fuel cell 2, on the basis of the current value (step S12). FIG. 6 illustrates a map that defines the relationship between the current value and the fuel gas consumed amount per unit time. The ECU 20 calculates the fuel gas consumed amount per unit time corresponding to the current value on the basis of the map, integrates the amount from time t1 to the present time, and calculates the integrated fuel gas consumed amount Q2. The maps illustrated in FIGS. 5 and 6 are defined through experiments beforehand and stored in the ROM of the ECU 20. The fuel gas consumed amount per unit time may be calculated by a calculation formula using the current value.

Figure 7:
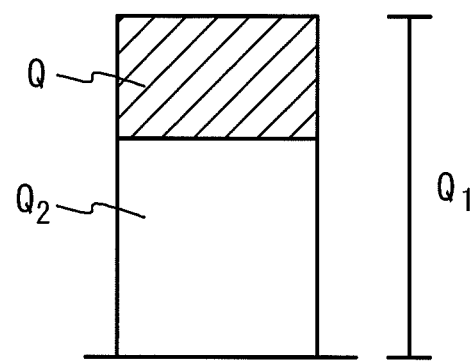
FIG. 7 illustrates a relationship among an integrated fuel gas lost amount, an integrated fuel gas consumed amount, and a discharge amount of the fuel gas.

The integrated fuel gas consumed amount Q2 mentioned above indicates the total amount of the fuel gas consumed by electric generation of the fuel cell 2. The integrated fuel gas lost amount Q1 indicates the total amount of the fuel gas that is lost from the supply passage 4, the circulation passage 8, and the fuel cell 2 regardless of cause. Thus, the integrated fuel gas lost amount Q1 includes the integrated fuel gas consumed amount Q2, which is the integrated amount of the fuel gas consumed by the electric generation of the fuel cell 2, and the discharge amount Q of the fuel gas discharged due to the opening of the discharge valve 16. FIG. 7 illustrates the relationship among the integrated fuel gas lost amount Q1, the integrated fuel gas consumed amount Q2, and the discharge amount Q of the fuel gas. Additionally, when the discharge of the stored water is not completed, the integrated fuel gas lost amount Q1 is substantially the same as the integrated fuel gas consumed amount Q2 consumed by the electrical generation. Thus, the discharge amount Q of the fuel gas is substantially zero.

Next, the ECU 20 calculates the discharge amount Q, obtained by subtracting the integrated fuel gas consumed amount Q2 from the integrated fuel gas lost amount Q1, as the estimated gas discharge amount (step S13). The above steps S11 to S13 are executed repeatedly until the estimated discharge amount reaches the target gas discharge amount as illustrated in FIG. 3 (No in step S5). When the estimated discharge amount reaches the target gas discharge amount (Yes in step S5), the discharge valve 16 is closed (step S6). In the above way, the discharge amount is estimated.

Figure 8:
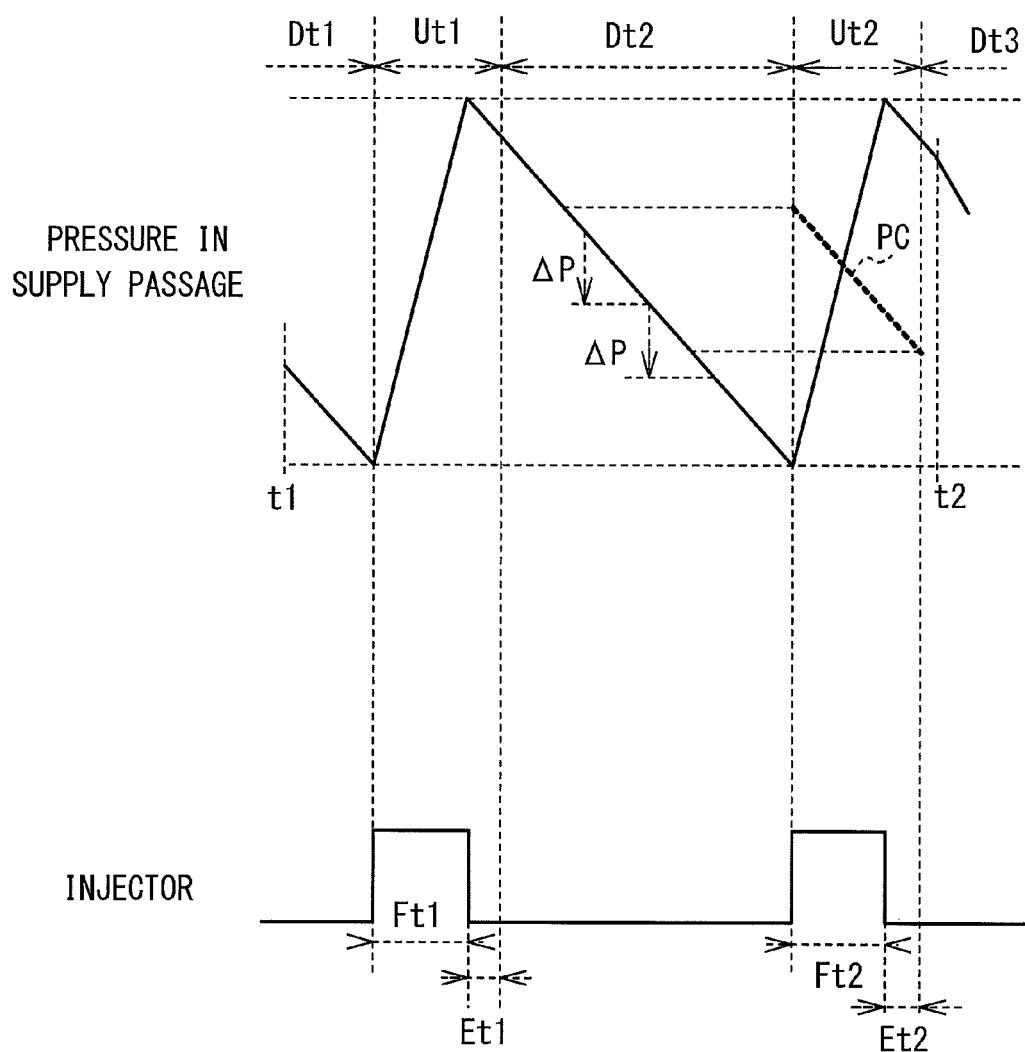
FIG. 8 is a timing chart for explaining calculation control of the integrated fuel gas lost amount.
Figure 9:
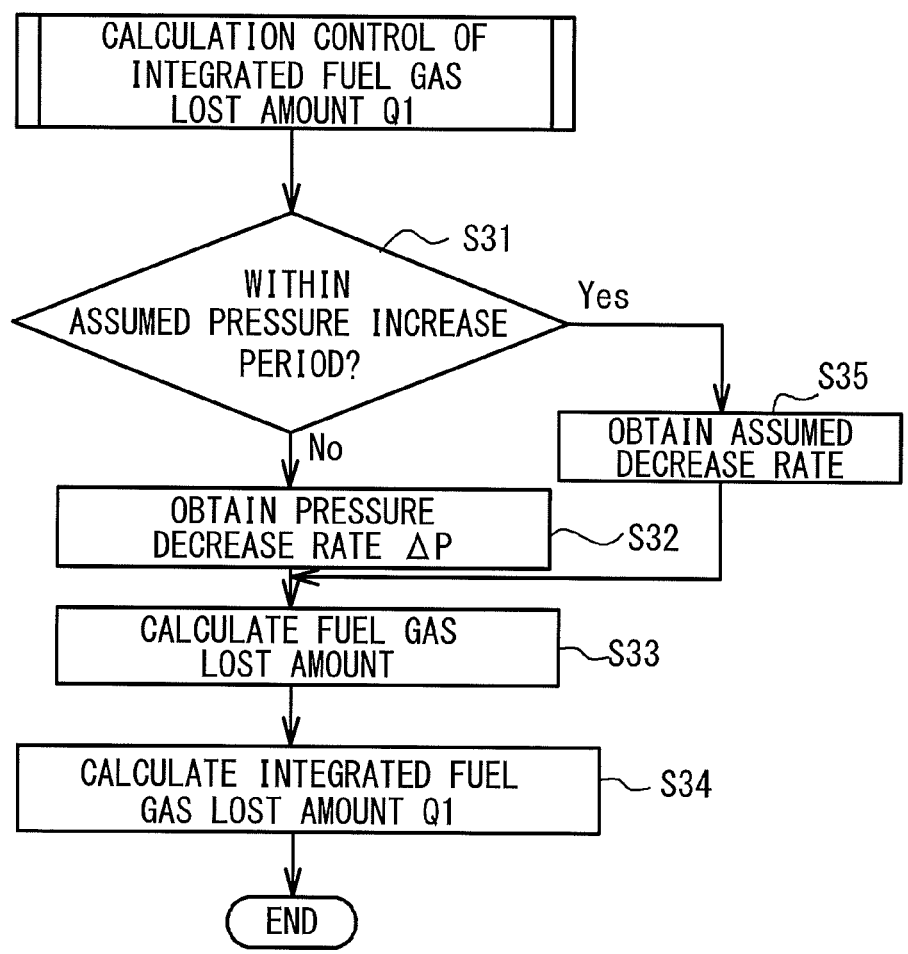
FIG. 9 is a flowchart of the calculation control of the integrated fuel gas lost amount.

A description will next be given of a method of calculating the integrated fuel gas lost amount Q1. FIG. 8 is a timing chart for explaining calculation control of the integrated fuel gas lost amount Q1. FIG. 9 is a flowchart of the calculation control of the integrated fuel gas lost amount Q1. The ECU 20 changes the method of calculating the fuel gas lost amount between pressure decrease periods Dt1, Dt2, Dt3, . . . during which the pressure in the supply passage 4 decreases and assumed pressure increase periods Ut1, Ut2, . . . during which the pressure in the supply passage 4 is assumed to increase, as illustrated in FIG. 8.

The assumed pressure increase period Ut1 is the sum of an injection period Ft1 of the fuel gas from the injector 10 and an additional period Et1 from the time the injection of the fuel gas is stopped. The additional period Et1 is configured to include the time when the actual pressure in the supply passage 4 starts decreasing after the injection of the fuel gas is stopped. That is to say, the assumed pressure increase period Ut1 is configured to be rather long so as to include the period during which the actual pressure in the supply passage 4 increases due to the injection of the fuel gas from the injector 10. In the same manner, the assumed pressure increase period Ut2 is the sum of an injection period Ft2 of the fuel gas and an additional period Et2 after the injection of the fuel gas is stopped. The ECU 20 can determine whether the present time is within the assumed pressure increase period Ut1, Ut2, . . . by sensing the timing of the start and the stop of the injection of the injector 10 based on the injection flag while the discharge valve 16 is opened.

In the present embodiment, the additional periods Et1, Et2, . . . are predetermined periods having the same duration. Thus, even when the injection periods Ft1, Ft2 differ from each other due to the change in the required amount of electric generation of the fuel cell 2, the periods calculated by respectively adding the same additional periods Et1, Et2 to the injection periods Ft1, Ft2 are used as the assumed pressure increase periods Ut1, Ut2. Since the injection period of the fuel gas changes depending on the required amount of electric generation of the fuel cell 2, the length of the additional period may be changed in accordance with the change of the injection period.

The pressure decrease periods Dt1, Dt2, Dt3, . . . are periods that do not correspond to the assumed pressure increase period within the period that the discharge valve 16 is opened. The ECU 20 determines whether the present time is within the assumed pressure increase period Ut1, Ut2, . . . with the aforementioned method, thereby determining whether the present time is within the pressure decrease period. The calculation control of the integrated fuel gas lost amount Q1 explained hereinafter with the flowchart of FIG. 9 will be described as a typical method of calculating the fuel gas lost amount during the pressure decrease period Dt2 and during the assumed pressure increase period Ut2.

As illustrated in FIG. 9, the ECU 20 determines whether the present time is within the assumed pressure increase period (step S31). When the determination is No, i.e., when the present time is within the pressure decrease period Dt2, the ECU 20 obtains the pressure decrease rate ΔP based on the detection value from the pressure sensor 21 (step S32). The ECU 20 obtains the pressure decrease rate ΔP per unit time during the pressure decrease period Dt2. More specifically, the ECU 20 calculates the pressure decrease rate ΔP by subtracting the present pressure value from the last pressure value detected by the pressure sensor 21 during the pressure decrease period Dt2. Then, the ECU 20 calculates the fuel gas lost amount per unit time based on the map of FIG. 5 described above (step S33). The fuel gas lost amount per unit time calculated through the above process is added to the integrated fuel gas lost amount, which has been calculated till the present time, to calculate the integrated fuel gas lost amount Q1 (step S34). The processes at steps S31 to S34 are repeated during the pressure decrease period Dt2, and thereby the fuel gas lost amount during the pressure decrease period Dt2 is reflected in the integrated fuel gas lost amount Q1. As described above, the pressure during the pressure decrease period Dt2 does not greatly change and is stable compared to the pressure during the assumed pressure increase period Ut1, Ut2, . . . . Thus, the fuel gas lost amount is calculated based on the pressure decrease rate ΔP obtained based on the detection value of the pressure sensor 21. Both during the discharge of the water and during the discharge of the fuel gas, the fuel gas lost amount is calculated based on the pressure decrease rate ΔP during the pressure decrease period within the period that the discharge valve 16 is opened. Steps S31 to S34 are continuously executed after the pressure decrease period Dt2.

When the present time is determined to be within the assumed pressure increase period Ut2 at step S31, the ECU 20 obtains the assumed decrease rate of the pressure during the assumed pressure increase period Ut2 (step S35). The assumed decrease rate is described later. The ECU 20 calculates the integrated fuel gas lost amount Q1 by adding the fuel gas lost amount per unit time during the assumed pressure increase period Ut2 to the integrated fuel gas lost amount, which has been calculated till the present time, based on the assumed decrease rate (step S34). The processes at step S35, S32 to S34 are repeated during the assumed pressure increase period Ut2, and thereby the fuel gas lost amount during the assumed pressure increase period Ut2 is reflected in the integrated fuel gas lost amount Q1.

The assumed decrease rate is a decrease rate that is assumed to be the same as the pressure decrease rate ΔP during the pressure decrease period Dt2. That is to say, the fuel gas lost amount during the assumed pressure increase period Ut2 is calculated not based on the actual pressure value or the change rate of the pressure during the assumed pressure increase period Ut2 but based on the assumed decrease rate. To facilitate understanding, FIG. 8 illustrates the assumed pressure line PC that decreases at the assumed decrease rate during the assumed pressure increase period Ut2. The assumed pressure increase period Ut2 is a period during which the pressure increases, and thus the fuel gas lost amount cannot be calculated based on the pressure decrease rate. However, the lost amount of the fuel gas can be calculated with high accuracy by calculating the fuel gas lost amount during the assumed pressure increase period Ut2 based on the assumed decrease rate. The fuel gas lost amount per unit time during the assumed pressure increase period Ut2 is calculated with the map in which the pressure decrease rate ΔP in the map of FIG. 5 is replaced with the assumed decrease rate, but the fuel gas lost amount per unit time may be calculated by a calculation formula using, for example, the assumed decrease rate. Both during the discharge of the water and during the discharge of the fuel gas, the fuel gas lost amount is calculated based on the assumed decrease rate during the assumed pressure increase period within the period that the discharge valve 16 is opened.

The ECU 20 uses the pressure decrease rate ΔP during the pressure decrease period Dt2 just before the assumed pressure increase period Ut2 as the assumed decrease rate during the assumed pressure increase period Ut2. The integrated fuel gas lost amount Q1 is calculated with higher accuracy by calculating the fuel gas lost amount during the assumed pressure increase period Ut2 just after the pressure decrease period Dt2 with use of the pressure decrease rate ΔP during the pressure decrease period Dt2 just before the assumed pressure increase period Ut2.

To facilitate understanding, FIG. 8 illustrates a case where the pressure decrease rate ΔP during the pressure decrease period Dt2 is constant, but the pressure decrease rate ΔP varies during the pressure decrease period Dt2 in fact. Thus, the ECU 20 uses the average value of the pressure decrease rates ΔP obtained during the pressure decrease period Dt2 as the assumed decrease rate during the assumed pressure increase period Ut2. This allows the fuel gas lost amount during the assumed pressure increase period Ut2 to be calculated with high accuracy.

The aforementioned calculation of the fuel gas lost amount is sequentially performed in the order of the pressure decrease period Dt1, the assumed pressure increase period Ut1, the pressure decrease period Dt2, and the assumed pressure increase period Ut2 within a period that the discharge valve 16 is opened, and the calculated fuel gas lost amount is sequentially integrated to calculate the final integrated fuel gas lost amount Q1. As described above, even during the assumed pressure increase periods Ut1, Ut2, . . . , the fuel gas lost amount can be also calculated with high accuracy based on the assumed decrease rate. Thus, the integrated fuel gas lost amount Q1 can be also calculated with high accuracy, and the deterioration in estimation accuracy of the gas discharge amount is reduced.

For the assumed decrease rate during the first assumed pressure increase period Ut1 after the discharge valve 16 is opened, used is the pressure decrease rate during the pressure decrease period Dt1 including the time before and after time t1 when the discharge valve 16 is opened.

Additionally, when the assumed pressure increase period includes time t1 when the discharge valve 16 is opened, the pressure decrease rate during the pressure decrease period before the discharge valve 16 is opened is used as the assumed decrease rate. In this case, the fuel gas lost amount is calculated based on the assumed decrease rate during the period from time t1 when the discharge valve 16 is opened till the assumed pressure increase period ends.

The present embodiment does not directly detect the actual pressure increase period based on the output value from the pressure sensor 21, but uses the sum of the injection period of the fuel gas from the injector 10 and the additional period after the injection of the fuel gas is stopped as the assumed pressure increase period. This is because, since the actual pressure increase period is short, the output value from the pressure sensor 21 may have a margin of error. However, the present invention does not exclude the use of the pressure increase period, during which the pressure actually increases, detected based on the output value from the pressure sensor 21 instead of the assumed pressure increase period. The actual pressure increase period may be detected based on the minimal value and the maximal value of the pressure values detected by the pressure sensor 21, and other periods may be detected as the pressure decrease period. Alternatively, a period calculated by adding a predetermined additional period to the actual pressure increase period detected based on the output value from the pressure sensor 21 may be used as the assumed pressure increase period. Alternatively, the injection period of the fuel gas may be used as the assumed pressure increase period.

The above embodiment uses the average value of the pressure decrease rates ΔP obtained during the pressure decrease period as the assumed decrease rate. Therefore, the pressure decrease rate ΔP is preferably obtained two or more times during the pressure decrease period.

The above embodiment uses the average value of the pressure decrease rates ΔP obtained during the pressure decrease period just before the assumed pressure increase period as the assumed decrease rate, but does not intend to suggest any limitation. For example, the pressure decrease rate during a freely selected period within the pressure decrease period just before the assumed pressure increase period may be used as the assumed decrease rate. Alternatively, the pressure decrease rate during a freely selected period within the pressure decrease period prior to the pressure decrease period just before the assumed pressure increase period may be used as the assumed decrease rate.

The above embodiment obtains the pressure decrease rate ΔP in the supply passage 4 based on the detection value from the pressure sensor 21, and calculates the integrated fuel gas lost amount Q1 based on the pressure decrease rate ΔP, but does not intend to suggest any limitation. For example, the ECU 20 may obtain the pressure decrease rate in the circulation passage 8 based on the detection value from the pressure sensor 22 detecting the pressure in the circulation passage 8, and may calculate the integrated fuel gas lost amount Q1 based on the pressure decrease rate in the circulation passage 8. This is because the injection of the fuel gas from the injector 10 causes the pressure in the circulation passage 8 to increase and decrease alternately through the supply passage 4 and the fuel cell 2, and because the opening of the discharge valve 16 causes the pressure in the circulation passage 8 to decrease. In this case, the pressure sensor 22 is an example of a pressure detecting portion that detects the pressure in the circulation passage 8. The pressure sensor 22 may be provided further upstream than the gas-liquid separator 12 in the circulation passage 8 or further downstream than the gas-liquid separator 12 in the circulation passage 8.

Figure 10:
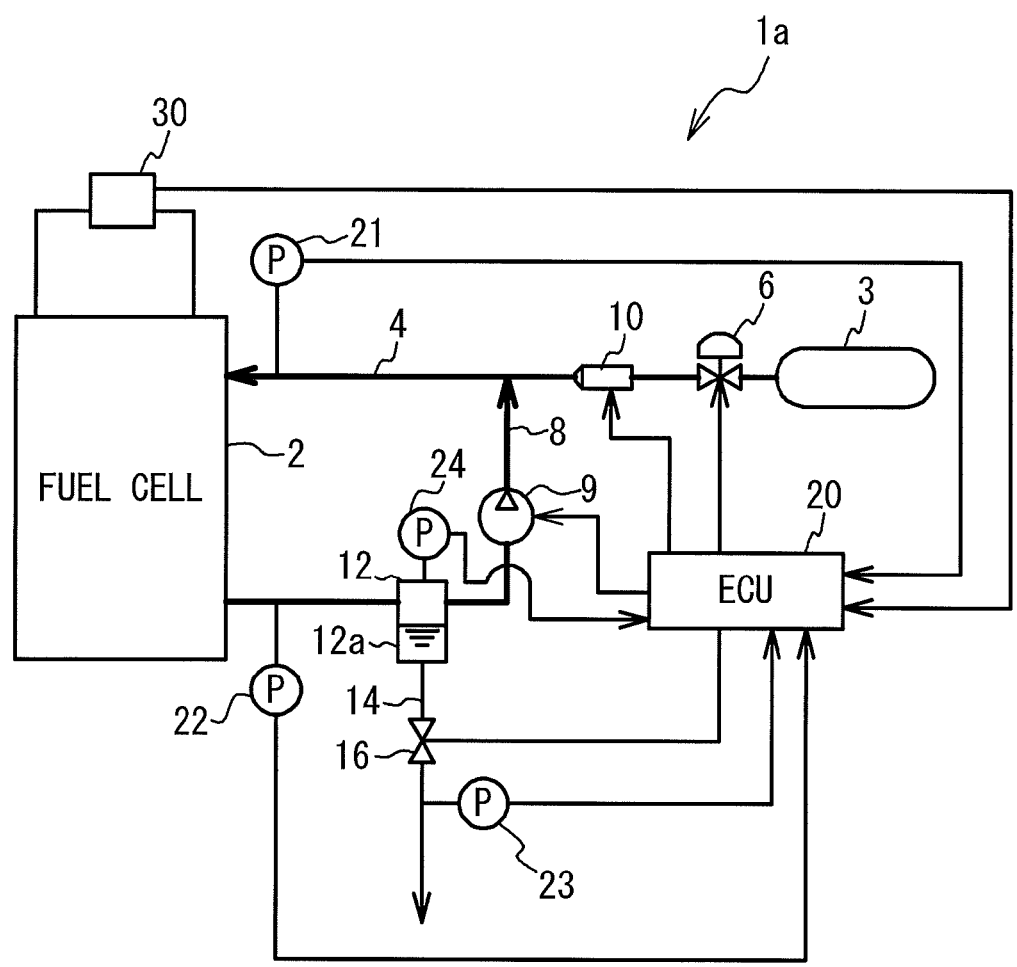
FIG. 10 is a schematic view of a fuel cell system in accordance with a first variation.

Next, the system according to a variation will be described. FIG. 10 is a schematic view of a fuel cell system 1a according to a first variation. Components that are similar to those of the above system 1 will be denoted by the similar reference numerals, and a detailed description of such components will be omitted. The system 1a includes a pressure sensor 24 that detects the pressure in the gas-liquid separator 12. The pressure sensor 24 is located at a high position so as not to be covered with the stored water in the gas-liquid separator 12. In the system 1a, the ECU 20 obtains the pressure decrease rate in the gas-liquid separator 12 based on the detection value from the pressure sensor 24, and calculates the integrated fuel gas lost amount Q1 based on the pressure decrease rate in the gas-liquid separator 12. This is because the injection of the fuel gas from the injector 10 causes the pressure in the gas-liquid separator 12 to increase and decrease alternately through the supply passage 4, the fuel cell 2, and the circulation passage 8, and because the opening of the discharge valve 16 causes the pressure in the gas-liquid separator 12 to decrease. In this case, the pressure sensor 24 is an example of a pressure detecting portion that detects the pressure in the gas-liquid separator 12.

Figure 11:
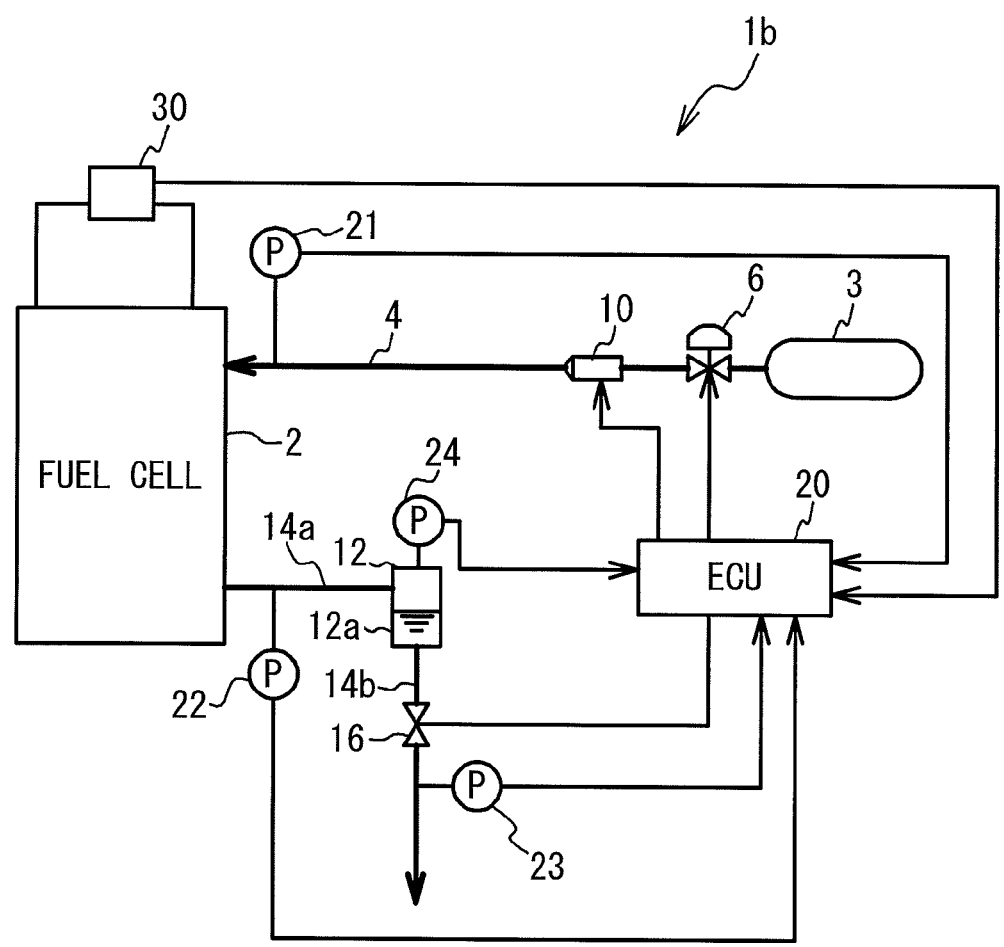
FIG. 11 is a schematic view of a fuel cell system in accordance with a second variation.

FIG. 11 is a schematic view of a system 1b according to a second variation. The system 1b is an anode non-circulation type unlike the systems 1 and 1a, does not include the circulation passage 8 or the circulation pump 9, and does not return the fuel gas discharged from the fuel cell 2 to the supply passage 4 or the fuel cell 2 again. The system 1b also includes: a first discharge passage 14a that supplies the fuel gas discharged from the fuel cell 2 to the gas-liquid separator 12; and a second discharge passage 14b that is connected to the gas-liquid separator 12 and discharges the fuel gas and the stored water in the gas-liquid separator 12 to the outside. The discharge valve 16 is arranged in the second discharge passage 14b. Thus, the fuel gas discharged from the fuel cell 2 is discharged to the outside by opening the discharge valve 16. The pressure sensor 22 is arranged in the first discharge passage 14a, and detects the pressure in the first discharge passage 14a. The pressure sensor 23 is arranged in the second discharge passage 14b, and detects the pressure at a point further downstream than the discharge valve 16 in the second discharge passage 14b.

Like the systems 1 and 1a, the system 1b can calculate the gas discharge amount Q, obtained by subtracting the integrated fuel gas consumed amount Q2 from the integrated fuel gas lost amount Q1, as the estimated gas discharge amount. The ECU 20 may obtain the pressure decrease rate ΔP in the supply passage 4 based on the detection value from the pressure sensor 21 to calculate the integrated fuel gas lost amount Q1 based on the pressure decrease rate ΔP. Alternatively, the ECU 20 may obtain the pressure decrease rate in the first discharge passage 14a based on the detection value from the pressure sensor 22 to calculate the integrated fuel gas lost amount Q1. Alternatively, the ECU 20 may obtain the pressure decrease rate in the gas-liquid separator 12 based on the detection value from the pressure sensor 24 that detects the pressure in the gas-liquid separator 12 to calculate the integrated fuel gas lost amount Q1. The pressure sensors 21, 22, and 24 are examples of pressure detecting portions that detect the pressure in the supply passage 4, in the first discharge passage 14a, and in the gas-liquid separator 12, respectively.

Although some embodiments of the present invention have been described in detail, the present invention is not limited to the specific embodiments but may be varied or changed within the scope of the present invention as claimed.

The above embodiment starts calculating the fuel gas lost amount and the fuel gas consumed amount when the discharge valve 16 is opened, but does not intend to suggest any limitation. The calculation of both may be started after the discharge valve 16 is opened, or just before the discharge valve 16 is opened. The time when the calculation of the fuel gas lost amount is started is preferably the same as the time when the calculation of the fuel gas consumed amount is started.

What is claimed is:

1. A fuel cell system comprising:
   a fuel cell;
   a fuel injection portion that is configured to intermittently inject a fuel gas to the fuel cell;
   a supply passage through which the fuel gas injected from the fuel injection portion flows to the fuel cell;
   a circulation passage through which the fuel gas partially discharged from the fuel cell flows to the supply passage;
   a gas-liquid separator that is arranged in the circulation passage and that stores and separates water from the fuel gas partially discharged from the fuel cell;
   a discharge passage that is connected to the gas-liquid separator, discharges stored water in the gas-liquid separator to an outside, and partially discharges the fuel gas partially discharged from the fuel cell to the outside;
   a discharge valve that is arranged in the discharge passage;
   a pressure detecting portion that detects pressure in the supply passage; and
   a control unit that is programmed to estimate a discharge amount of the fuel gas during an opening period of the discharge valve based on a lost amount of the fuel gas during the opening period of the discharge valve and a consumed amount of the fuel gas by electric power generation of the fuel cell during the opening period of the discharge valve, wherein
   a pressure increase period during which the pressure in the supply passage increases and a pressure decrease period during which the pressure in the supply passage decreases exist due to the intermittent injection of the fuel gas from the fuel injection portion, and the control unit that is programmed to estimate the lost amount of the fuel gas based on a decrease rate of the pressure (ΔP) during the pressure decrease period within the opening period of the discharge valve, and an assumed decrease rate of the pressure during the pressure increase period within the opening period of the discharge valve, the assumed decrease rate of the pressure is regarded as decreasing at the same decrease rate as the decrease rate of the pressure (ΔP) during the pressure decrease period.

2. The fuel cell system according to claim 1, wherein the control unit is programmed to use the decrease rate of the pressure during the pressure decrease period just before the pressure increase period as the assumed decrease rate of the pressure during the pressure increase period.

3. The fuel cell system according to claim 1, wherein the control unit is programmed to use an average value of decrease rates of the pressure obtained during the pressure decrease period as the assumed decrease rate of the pressure.

4. The fuel cell system according to claim 1, wherein the control unit is programmed to close the discharge valve when an estimated discharge amount of the fuel gas is not less than a target discharge amount.

5. A fuel cell system comprising:
a fuel cell;
a fuel injection portion that is configured to intermittently inject a fuel gas to the fuel cell;
a supply passage through which the fuel gas injected from the fuel injection portion flows to the fuel cell;
a circulation passage through which the fuel gas partially discharged from the fuel cell flows to the supply passage;
a gas-liquid separator that is arranged in the circulation passage and that stores and separates water from the fuel gas partially discharged from the fuel cell;
a discharge passage that is connected to the gas-liquid separator, discharges stored water in the gas-liquid separator to an outside, and partially discharges the fuel gas partially discharged from the fuel cell to the outside;
a discharge valve that is arranged in the discharge passage;
a pressure detecting portion that detects one of pressure in the circulation passage and pressure in the gas-liquid separator; and
a control unit that is programmed to estimate a discharge amount of the fuel gas during an opening period of the discharge valve based on a lost amount of the fuel gas during the opening period of the discharge valve and a consumed amount of the fuel gas by electric power generation of the fuel cell during the opening period of the discharge valve, wherein
a pressure increase period during which the one of pressure in the circulation passage and pressure in the gas-liquid separator increases and a pressure decrease period during which the one of pressure in the circulation passage and pressure in the gas-liquid separator decrease exist due to the intermittent injection of the fuel gas from the fuel injection portion, and the control unit that is programmed to calculate the lost amount of the fuel gas during the opening period based on a decrease rate of the pressure (ΔP) during the pressure decrease period within the opening period of the discharge valve, and an assumed decrease rate of the pressure during the pressure increase period within the opening period of the discharge valve, the assumed decrease rate of the pressure is regarded as decreasing at the same decrease rate as the decrease rate of the pressure (ΔP) during the pressure decrease period.

6. An anode non-circulation type fuel cell system which does not return fuel gas partially discharged from a fuel cell to a supply passage, comprising:
the fuel cell;
a fuel injection portion that is configured to intermittently inject a fuel gas to the fuel cell;
the supply passage through which the fuel gas injected from the fuel injection portion flows to the fuel cell;
a gas-liquid separator that stores and separates water from the fuel gas discharged from the fuel cell;
a first discharge passage that supplies the fuel gas partially discharged from the fuel cell to the gas-liquid separator;
a second discharge passage that is connected to the gas-liquid separator, discharges stored water in the gas-liquid separator to an outside, and partially discharges the fuel gas partially discharged from the fuel cell to the outside;
a discharge valve that is arranged in the second discharge passage;
a pressure detecting portion that detects one of pressure in the supply passage, pressure in the first discharge passage, and pressure in the gas-liquid separator; and
a control unit that is programmed to estimate a discharge amount of the fuel gas during an opening period of the discharge valve based on a lost amount of the fuel gas during the opening period of the discharge valve and a consumed amount of the fuel gas by electric power generation of the fuel cell during the opening period of the discharge valve, wherein
a pressure increase period during which the one of pressure in the supply passage, pressure in the first discharge passage, and pressure in the gas-liquid separator increases and a pressure decrease period during which the one of pressure in the supply passage, pressure in the first discharge passage, and pressure in the gas-liquid separator decreases exist due to the intermittent injection of the fuel gas from the fuel injection portion, and the control unit that is programmed to calculate the lost amount of the fuel gas during the opening period based on a decrease rate of the pressure (ΔP) during the pressure decrease period of the discharge valve within the opening period and an assumed decrease rate of the pressure during the pressure increase period within the opening period of the discharge valve, the assumed decrease rate of the pressure is regarded as decreasing at the same decrease rate as the decrease rate of the pressure (ΔP) during the pressure decrease period.

* * * * *